(12) United States Patent
Ide et al.

(10) Patent No.: US 10,792,949 B2
(45) Date of Patent: Oct. 6, 2020

(54) INFORMATION RECORDING MEDIUM, LABEL, CARD AND METHOD OF AUTHENTICATION

(71) Applicant: TOPPAN PRINTING CO., LTD., Tokyo (JP)

(72) Inventors: Hidetaka Ide, Tokyo (JP); Naoki Minamikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/692,719

(22) Filed: Nov. 22, 2019

(65) Prior Publication Data
US 2020/0086675 A1 Mar. 19, 2020

Related U.S. Application Data

(63) Continuation of application No. PCT/JP2018/020213, filed on May 25, 2018.

(30) Foreign Application Priority Data

May 25, 2017 (JP) ................................. 2017-103231

(51) Int. Cl.
*B42D 25/328* (2014.01)
*B42D 25/387* (2014.01)
(Continued)

(52) U.S. Cl.
CPC ......... *B42D 25/328* (2014.10); *B42D 25/387* (2014.10); *B42D 25/455* (2014.10); *B42D 25/46* (2014.10); *B42D 25/47* (2014.10)

(58) Field of Classification Search
CPC .. B42D 25/328; B42D 25/387; B42D 25/455; B42D 25/46; B42D 25/47; B42D 25/435; G02B 5/18; G09F 3/02
(Continued)

(56) References Cited

U.S. PATENT DOCUMENTS

| 10,173,452 B2 | 1/2019 | Motoi et al. |
| 2004/0265552 A1 * | 12/2004 | Lutz ......................... B41M 3/14 428/212 |
| 2005/0142342 A1 | 6/2005 | Lutz et al. |

FOREIGN PATENT DOCUMENTS

| JP | 2000-047555 A | 2/2000 |
| JP | 6107137 B2 | 4/2017 |
| WO | WO-03/095745 A1 | 11/2003 |

OTHER PUBLICATIONS

International Searching Authority, "International Search Report," issued in connection with International Patent Application No. PCT/JP2018/020213, dated Aug. 7, 2018.
(Continued)

*Primary Examiner* — Justin V Lewis
(74) *Attorney, Agent, or Firm* — Foley & Lardner LLP

(57) ABSTRACT

An information recording medium is formed by laminating a transparent protective layer and a base material having laser color-developing properties. The information recording medium includes an intermediate layer that is disposed between the transparent protective layer and the base material. In the information recording medium, the intermediate layer includes a diffraction structure layer that has a diffraction structure, and a first reflective layer that reflects visible light and is destroyed when irradiated with a laser beam. Light, when incident from a transparent protective layer side, causes a diffracted light pattern to appear in the diffraction structure layer so as to be observable from the transparent protective layer side. A laser beam, when applied from the transparent protective layer side, passes through the diffraction structure layer, destroys the first reflective layer, and develops color in the base material.

10 Claims, 8 Drawing Sheets

(51) Int. Cl.
*B42D 25/455* (2014.01)
*B42D 25/46* (2014.01)
*B42D 25/47* (2014.01)
*B42D 25/435* (2014.01)
*G02B 5/18* (2006.01)
*G06F 3/02* (2006.01)

(58) Field of Classification Search
USPC ........ 283/67, 70, 72, 74, 85, 86, 87, 94, 98, 283/109, 110, 901
See application file for complete search history.

(56) References Cited

OTHER PUBLICATIONS

International Searching Authority, "Written Opinion," issued in connection with International Patent Application No. PCT/JP2018/020213, dated Aug. 7, 2018.
Extended European Search Report dated Apr. 6, 2020 for corresponding patent Application No. 18806501.5.

* cited by examiner

INFORMATION RECORDING MEDIUM, LABEL, CARD AND METHOD OF AUTHENTICATION

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/020213, filed on May 25, 2018, which is based upon and claims the benefit of priority to Japanese Patent Application No. 2017-103231, filed on May 25, 2017; the disclosures of which are all incorporated herein by reference in their entireties.

TECHNICAL FIELD

Techniques regarding verification information recording media used for ID cards, passports, driving licenses, or the like, or regarding labels or cards to which an information recording medium is affixed are publicly available. Also, methods of authenticating information recording media are publicly available.

BACKGROUND ART

Information recording media having record thereon of verification information are used for ID cards, passports, driving licenses, or the like. Such information recording media are produced by encapsulating and integrating therein a hologram, which is a diffraction structure or a kind of a diffraction structure. This type of information recording media is advantageous in that they are quite resistant to chemicals, abrasion or direct alteration, or are unlikely to be detached from the base material by a fraudulent means because of being integrated in the base material, compared to other modes of information recording media which are produced by transferring a diffraction structure that has been formed on a transfer foil or the like to a surface of a medium for arrangement thereon.

As a method of preventing this type of information recording media from falsification or counterfeiting, PTL 1 (JP 6107137 B2) discloses laser engraving. The information recording medium used for laser engraving includes a color-developing layer which has a characteristic of changing its color by absorbing a laser beam having a specific wavelength. A laser beam adjusted to an appropriate intensity, period and size is applied to the information recording medium to change the color of the color-developing layer to black and record information thereon.

Laser engraving, which enables writing of information that is different between information recording media, can be used for engraving personal information, such as the owner's face, signature or address.

SUMMARY OF THE INVENTION

Such information recording media based on conventional art suffer from issues as set forth below.

The diffraction structure encapsulated in such a conventional information recording medium is produced by duplicating the same motif from the same relief plate. Therefore, it is difficult to produce motifs that are different between media, and thus a diffraction structure as a common motif is used.

Because a common motif is used, there is a risk that counterfeiting may be performed by fraudulently extracting the diffraction structure for falsification of only the personal information, or affixing the diffraction structure extracted beforehand to the falsified personal information. It is also difficult to recognize the occurrence of falsification or counterfeiting.

Therefore, there is a need to provide information recording media which take even higher-quality countermeasures against falsification or counterfeiting of the diffraction structures, holograms as a kind of diffraction structures, or printed portions where personal information is printed.

Furthermore, there is a need to provide a method of authentication for easily detecting falsification or counterfeiting, if any, of information recording media.

Under these circumstances, there is provided an information recording medium having a diffraction structure or a printed portion which is difficult to falsify or counterfeit, and a card or a label to which the information recording medium is affixed.

Furthermore, there is provided a method of authentication by which falsification or counterfeiting, if any, can easily be detected for information recording media.

The following measures are taken.

A first aspect of the present invention is an information recording medium which is formed by laminating a transparent protective layer and a base material having laser color-developing properties, and includes an intermediate layer disposed at a part between the transparent protective layer and the base material. The intermediate layer includes a diffraction structure layer that has a diffraction structure, and a first reflective layer that reflects visible light and is destroyed when irradiated with a laser beam. Light, when incident from a transparent protective layer side, causes a diffracted light pattern to appear in the diffraction structure layer so as to be observable from the transparent protective layer side. A laser beam, when applied from the transparent protective layer side, passes through the diffraction structure layer, destroys the first reflective layer, and develops color in the base material.

In a second aspect of the present invention according to the information recording medium of the first aspect of the present invention, the intermediate layer further includes a second reflective layer that transmits light of a first wavelength range and reflects visible light outside the first wavelength range.

In a third aspect of the present invention according to the information recording medium of the second aspect of the present invention, the diffraction structure layer and the second reflective layer have refractive indices having a difference therebetween of about 0.2 or more and about 1.3 or less.

In a fourth aspect of the present invention according to the information recording medium of any one of the first to third aspects of the present invention, a colored layer is disposed between the base material and the intermediate layer, the colored layer transmitting visible light of a second wavelength range and reflecting visible light outside the second wavelength range.

In a fifth aspect of the present invention according to the information recording medium of the fourth aspect of the present invention, the colored layer contains a color former that develops color when irradiated with a laser beam and changes color-development intensity depending on the laser irradiation conditions.

In a sixth aspect of the present invention according to the information recording medium of the fifth aspect of the present invention, the colored layer is enclosed between the base material and the intermediate layer so that a shape of the colored layer is not observable from outside. The colored layer has an arbitrary shape. When a laser beam is applied from the transparent protective layer side, the laser beam develops color in a region where the colored layer is present and develops no color in a region where the colored layer is not present. Thus, the region that has been colored conforming to the shape of the colored layer can be observed.

A seventh aspect of the present invention is an information recording medium which is formed by laminating a transparent protective layer and a base material having laser color-developing properties, and includes an intermediate layer disposed at a part between the transparent protective layer and the base material. The intermediate layer includes a diffraction structure layer that has a diffraction structure, a first reflective layer that reflects visible light and is destroyed when irradiated with a laser beam, and a second reflective layer that is not destroyed when irradiated with the laser beam, transmits light of a first wavelength range, and reflects visible light outside the first wavelength range. When a laser beam is continuously applied while being moved, from the transparent protective layer side, to both the region where the intermediate layer is disposed and the region where it is not disposed, a first laser beam applied to the intermediate layer via the transparent protective layer passes through the diffraction structure layer, destroys the first reflective layer, passes through the second reflective layer, and develops color in the base material. The base material colored as a result of irradiation by the first laser beam is shielded by the second reflective layer and is not observable from the transparent protective layer side. A second laser beam that has entered the base material via the transparent protective layer but not via the intermediate layer develops color in the base material. The base material colored by the second laser beam is observable from the transparent protective layer side. As a result, a color development pattern provided with a countermark that has a shape determined by the arrangement of the intermediate layer is realized.

In an eighth aspect of the present invention according to the information recording medium of the seventh aspect of the present invention, the intermediate layer is completely encapsulated in the base material or the transparent protective layer to configure an integrated laminate.

In a ninth aspect of the present invention according to the information recording medium of the first or seventh aspect of the present invention, the base material is permitted to develop color in a color development pattern conforming to personal verification information.

A tenth aspect of the present invention is a label to which the information recording medium according to the first or seventh aspect of the present invention is affixed.

An eleventh aspect of the present invention is a card to which the information recording medium according to the first or seventh aspect of the present invention is affixed.

Furthermore, the following measures are taken.

A twelfth aspect of the present invention is a method of authentication applied to an information recording medium which is formed by laminating a transparent protective layer and a base material having laser color-developing properties. The information recording medium includes an intermediate layer that is disposed between the transparent protective layer and the base material. The intermediate layer includes a diffraction structure layer that has a diffraction structure, and a first reflective layer that reflects visible light and is destroyed when irradiated with a laser beam. The information recording medium further includes a colored layer at a part between the base material and the intermediate layer, the colored layer developing color when irradiated with a laser beam. The information recording medium is determined as being authentic if a color development pattern achieved with application of a laser beam from the transparent protective layer side of the information recording medium matches an arrangement of the colored layer, and is determined as not being authentic if the color development pattern does not match the arrangement of the colored layer.

A thirteenth aspect of the present invention is a method of authentication applied to an information recording medium which is formed by laminating a transparent protective layer and a base material having laser color-developing properties. The information recording medium includes an intermediate layer that is disposed at a part between the transparent protective layer and the base material. The intermediate layer includes a diffraction structure layer that has a diffraction structure, a first reflective layer that reflects visible light and is destroyed when irradiated with a laser beam, and a second reflective layer that is not destroyed when irradiated with the laser beam, transmits light of a first wavelength range, and reflects visible light outside the first wavelength range. When the laser beam is continuously applied while being moved, from the transparent protective layer side, to both the region where the intermediate layer is disposed and the region where it is not disposed, the information recording medium is determined as being authentic if a color development pattern having a countermark, whose shape is determined by the arrangement of the intermediate layer, is obtained by color development of the base material, and is determined as not being authentic if the color developed pattern is not obtained by color development of the base material.

According to the information recording medium of the first aspect of the present invention, light that is incident on the diffraction structure from the transparent protective layer side develops diffracted light in an observable arbitrary pattern, such as characters or motifs, in a predetermined angular range of the diffraction structure layer. An observer can observe this pattern.

Furthermore, when a laser beam is applied to the base material from the transparent protective layer side via the intermediate layer, the laser beam passes through the diffraction structure and instantaneously destroys the first reflective layer having no optical transparency. After that, the laser beam reaches the base material and develops color therein to provide engraving.

In this way, the information recording medium enables arbitrary engraving, and enables observation of the color-developed base material via the intermediate layer and the transparent protective layer. Accordingly, by changing the observation angle, both the diffracted light caused by the diffraction structure and the engraving of the color-developed base material can be observed from the same face of the information recording medium.

In the information recording medium, the diffraction structure is laminated between the base material and the transparent protective layer and integrated. Accordingly, it is physically difficult to falsify or counterfeit the diffraction structure. In addition, replacement of the engraved base material alone may only leave a trace of removed portions of the first reflective layer in a pattern conforming to the previous engraving. Engraving as a result of falsification or counterfeiting cannot be observed because of being shielded by the first reflective layer. Consequently, falsification or counterfeiting is extremely difficult.

According to the information recording medium of the second aspect of the present invention, when light is incident on the second reflective layer, the reflected light appears to be a specific color. Thus, depending on the observation angle, three kinds of light are presented, i.e., the engraving of the color-developed base material, the diffracted light caused by the diffraction structure, and the reflected light of the specific color. Since the information recording medium emits light in an extremely complicated pattern, reproduction of the pattern is not easy. Falsification or counterfeiting, if any, is easily detected due to emission of different light. Therefore, falsification or counterfeiting is extremely difficult.

According to the information recording medium of the third aspect of the present invention, when a laser beam is applied from the transparent protective layer side and the first reflective layer is destroyed by the laser beam, the observer can observe diffracted light caused by the diffraction structure at some observation angle in the laser-engraved area while the second reflective layer keeps its transparency, due to the difference in refractive index between the diffraction structure layer and the second reflective layer. Since the information recording medium emits light in an extremely complicated pattern, reproduction of the pattern is not easy. Falsification or counterfeiting, if any, is easily detected due to emission of different diffracted light. Therefore, falsification or counterfeiting is extremely difficult.

According to the information recording medium of the fourth aspect of the present invention, when data is written into the medium by application of a laser beam from the transparent protective layer side, engraving in the lowermost base material comes to appear being colored because a colored layer is provided above the engraved base material. This is not easy to reproduce. Falsification or counterfeiting, if any, is easily found because the engraving appears different. Consequently, falsification or counterfeiting is extremely difficult.

According to the information recording medium of the fifth aspect of the present invention, the intensity of color development depends on the laser irradiation conditions. Thus, arbitrary engraving density can be produced with one color. This is not easy to reproduce. Falsification or counterfeiting, if any, is easily detected because the engraving appears different. Consequently, falsification or counterfeiting is extremely difficult.

According to the information recording medium of the sixth aspect of the present invention, when data is written into the medium by application of a laser beam toward the intermediate layer from the transparent protective layer side, the region where the colored layer is present is colored and the region where the colored layer is not present is not colored. This color development pattern can be authenticated by only those who are aware of the shape of the colored layer. Accordingly, it is impossible for a third party to reproduce the correct color development pattern by falsification or counterfeiting. Therefore, the information recording medium cannot be falsified or counterfeited.

According to the information recording medium of the seventh aspect of the present invention, when an intermediate layer is formed on only a part of a base material, and a laser beam is continuously applied while being moved to both the region where the intermediate layer is disposed and the region where it is not disposed, a color development pattern having a countermark, whose shape is determined by the arrangement of the intermediate layer, is obtained. The color development pattern with a countermark can be authenticated by only those who are aware of the arrangement of the intermediate layer. Accordingly, it is impossible for a third party to reproduce a color development pattern having a correct countermark by falsification or counterfeiting. Therefore, the information recording medium cannot be falsified or counterfeited.

According to the information recording medium of the eighth aspect of the present invention, the intermediate layer is completely enclosed between the base material and the transparent protective layer. This makes it difficult to falsify or counterfeit the information recording medium by physically separating the base material and affixing another base material instead.

According to the information recording medium of the ninth aspect of the present invention, falsification or counterfeiting of personal verification information becomes more difficult by applying the information recording medium of the first or seventh aspect of the present invention which is difficult to falsify or counterfeit.

According to the label of the tenth aspect of the present invention and the card of the eleventh aspect of the present invention, falsification or counterfeiting becomes more difficult than in the conventional art by affixing the information recording medium of the first or seventh aspect of the present invention to the label or the card.

According to the method of authentication of the twelfth aspect of the present invention, when data is written into the medium by application of a laser beam toward the intermediate layer from the transparent protective layer side, the region where the colored layer is present is colored and the region where the colored layer is not present is not colored. The information recording medium can be easily authenticated based on this colored pattern.

According to the method of authentication of the thirteenth aspect of the present invention, when an intermediate layer is formed on only a part of a base material, and a laser beam is continuously applied while being moved to both the region where the intermediate layer is disposed and the region where it is not disposed, a color development pattern having a countermark, whose shape is determined by the arrangement of the intermediate layer, is obtained. The information recording medium can be easily authenticated based on this color development pattern having a countermark.

DETAILED DESCRIPTION OF REPRESENTATIVE EMBODIMENTS

Figure 1:
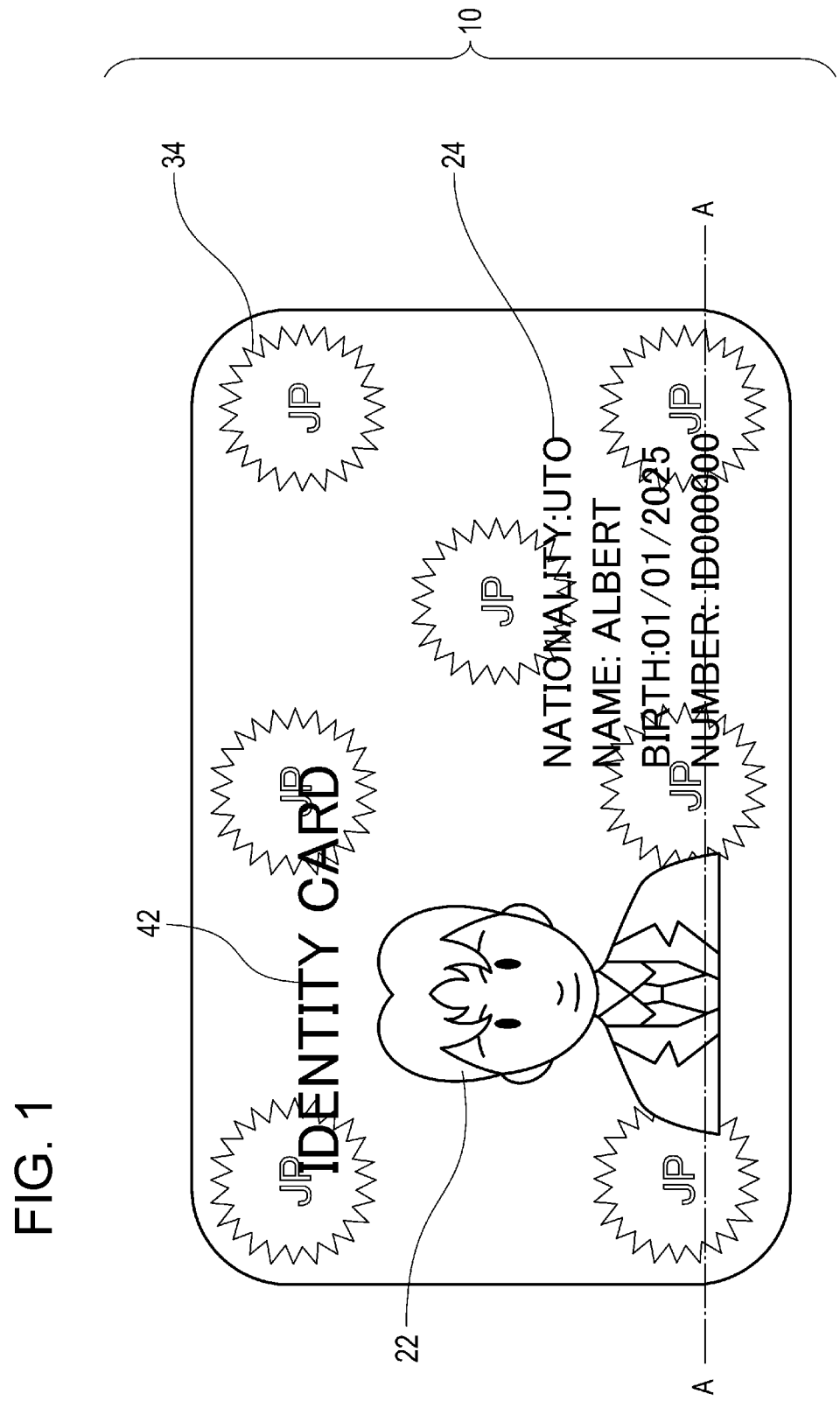
FIG. 1 is a schematic plan view illustrating an information recording medium according to a first embodiment of the present invention.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment of the Present Invention

FIG. 1 is a schematic plan view illustrating an information recording medium 10 according to a first embodiment of the present invention.

Figure 2:
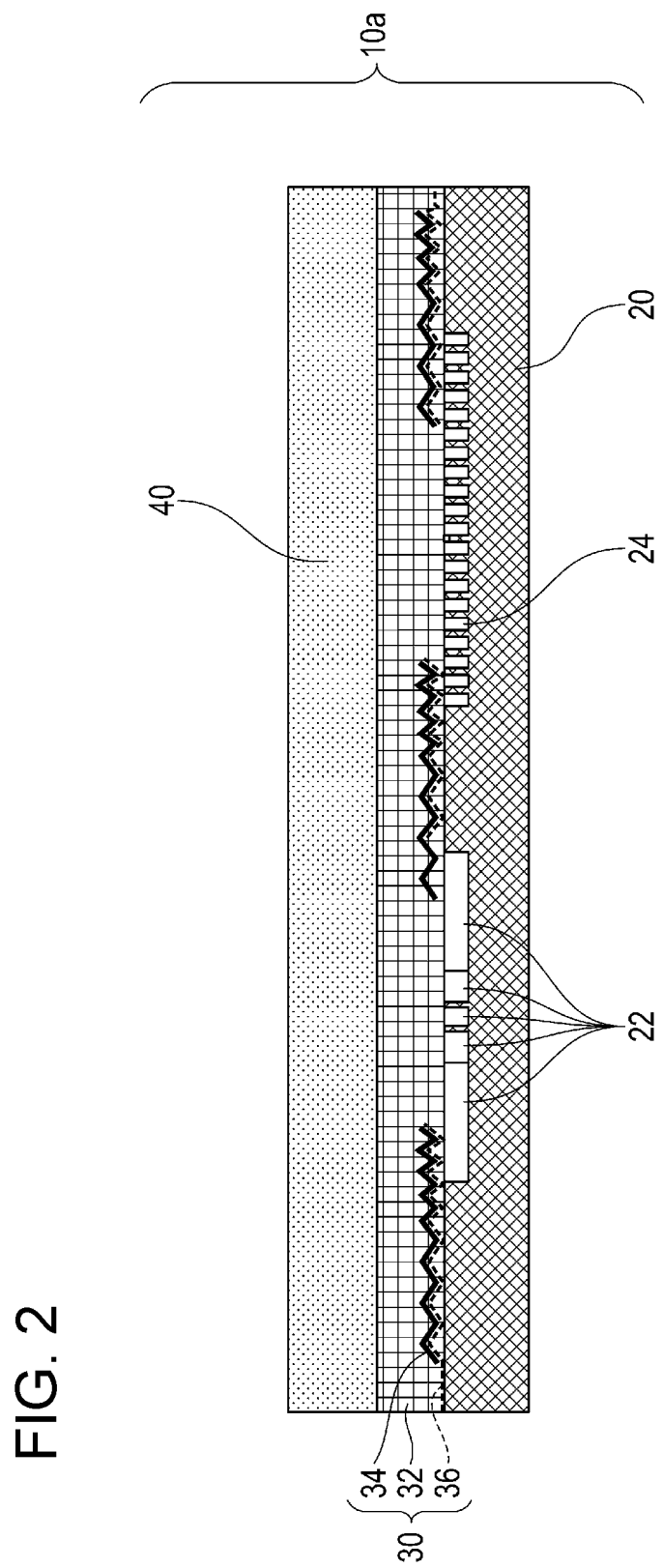
FIG. 2 is a schematic cross-sectional view illustrating the information recording medium according to the first embodiment of the present invention.

FIG. 2 is a schematic cross-sectional view illustrating an information recording medium 10a according to the first embodiment of the present invention. FIG. 2 is a cross-sectional view taken along the line A-A of the information recording medium 10 shown in FIG. 1.

In the information recording media 10a, which can be applied to an anti-counterfeiting medium, an intermediate layer 30 and a transparent protective sheet 40 are laminated in this order on at least one surface of a base material 20. The intermediate layer 30 includes a diffraction structure layer 32 and a first reflective layer 36. The diffraction structure layer 32 includes a diffraction structure 34 which is formed on the entirety or a part of the diffraction structure layer 32 to develop a photochromic pattern. The reflective layer 36 reflects visible light and is destroyed by application of a laser beam.

Although FIG. 1 shows a printed layer 42, it is not shown in FIG. 2. The location of the printed layer 42 is not particularly limited as long as it is observable when observing the information recording medium 10. From the perspective of durability, the printed layer 42 may be disposed between the transparent protective sheet 40 and the intermediate layer 30 or between the intermediate layer 30 and the base material 20.

The base material 20 may be a laser color-developing polycarbonate, which is formulated by adding an energy absorber that absorbs laser wavelengths to a polycarbonate material. The base material 20 may have a thickness in the range of 50 μm or more and 800 μm or less. If the thickness is smaller than 50 μm, physical strength as a base material 20 may be insufficient, handling may be difficult, and wrinkles may easily occur when providing the printed layer 42 or the like. If the thickness is larger than 800 μm, the unevenness in thickness or warpage of the base material 20 tends to greatly influence the processing of the medium.

The material of the transparent protective sheet 40 is a transparent plastic that transmits a laser and visible light. The transparent plastic may be polycarbonate. The transparent protective sheet 40 may have a thickness in the range of 50 μm or more and 800 μm or less. If the thickness is smaller than 50 μm, physical strength as a base material 40 may be insufficient, handling may be difficult, and wrinkles may easily occur when providing the printed layer 42 or the like. If the thickness is larger than 800 μm, the unevenness in thickness or warpage of the base material 40 tends to greatly influence the processing of the medium.

The diffraction structure layer 32 and the first reflective layer 36 of the intermediate layer 30 are formed on the transparent protective sheet 40 by the following method.

The diffraction structure layer 32 is provided to form the diffraction structure 34. The material of the diffraction structure layer 32 may be a material having transparency. This material may be a thermoplastic resin, a thermosetting resin, or an ultraviolet- or electron beam-curable resin. The thermoplastic resin may be an acrylic resin, an epoxy resin, a cellulose resin, a vinyl resin or a polycarbonate resin. The diffraction structure layer 32 may have a thickness of 0.5 μm or more and 25 μm or less.

The diffraction structure layer 32 may be made of a resin obtained by adding polyisocyanate, as a cross-linking agent, to acrylic polyol, polyester polyol, or the like having a reactive hydroxy group to achieve cross-linkage. This resin may be a urethane resin, a melamine-based resin or phenol-based resin. The ultraviolet- or electron beam-curable resin may be epoxy (meth)acrylate, urethane (meth)acrylate, or the like.

In the present embodiment, the resin is not limited to the resin mentioned above but may contain still another additive to improve processing suitability, as long as a desired shape is formed by a transparent resin.

The diffraction structure 34 formed in the diffraction structure layer 32 may be a diffraction structural skeleton. The diffraction structural skeleton may be a relief diffraction grating, a volume diffraction grating, or the like.

The relief diffraction grating has a surface on which a diffraction grating is recorded in the form of a fine uneven pattern. The relief diffraction grating is formed by two-beam interferometry. Specifically, in this method, two beams of light coherent with each other are applied to a surface of a photosensitive resin to generate interference fringes thereon and these interference fringes are recorded in the form of unevenness on the photosensitive resin. The interference fringes formed by two-beam interferometry also provide a diffraction grating. By selecting the two beams of light mentioned above, a desired three-dimensional image may be recorded as a diffraction grating pattern. The pattern may be recorded so that a different image (termed changing image hereinafter) can be observed depending on the angle of observation.

In the present embodiment, two-beam interferometry, that is a method of producing a hologram known in the art, may be applied to the recording of an image pattern that serves as a diffraction grating structure. The hologram known in the art may be an image hologram or Lippmann hologram, a rainbow hologram, integral hologram, or the like.

In a relief diffraction grating, a surface of an electron beam-curable resin is irradiated with and exposed to an electron beam to form a striped pattern that is an uneven pattern serving as a diffraction structure. In this case, the interference fringes can be individually controlled. Accordingly, a desired three-dimensional image or a changing image can be recorded as when forming a hologram. An image may be divided into dot-like cells to record therein respective diffraction gratings different from each other, so that an assembly of these pixels can express a complete image. These cells may be circular dots or astral dots.

An induced surface relief forming method may be used for forming the uneven pattern. Specifically, an amorphous film of a polymer having azobenzene on a side chain is irradiated with relatively weak light of around several tens of $mW/cm^2$ having a wavelength in the blue to green wavelength range to cause polymer molecule migration at the several μm scale and form a relief of unevenness on the surface of the film.

A relief master plate having the uneven pattern as formed is subjected to electroplating to form a metal film on a surface thereof. Thus, the uneven pattern of the relief master plate is duplicated for use as a pressing plate. The pressing plate is thermally pressed against a resin layer laminated on a carrier to transfer the fine uneven pattern onto the surface of the resin layer and form a diffraction structure layer 32.

The first reflective layer 36 may be a metal film. The metal film of the first reflective layer 36 may be formed by a vacuum film deposition method so that a film is formed on the front of the diffraction structure formed-layer without filling the unevenness of the fine uneven structure. The metal film may be made of Al, Sn, Cr, Ni, Cu, Au, brass, or the like. The vacuum film deposition method may be a vacuum vapor deposition method, sputtering method, or the like. The first reflective layer 36 may have a thickness in the range of 5 nm or more and 100 nm or less. In the present embodiment, from the perspective of transmittance of visible light, the thickness may be in the range of 10 nm or more and 80 nm or less.

The first reflective layer 36 may be formed on a part of the fine uneven structure. In this case, a more advanced processing technique is required but a finer design can be provided. Accordingly, a higher anti-counterfeiting effect can be achieved than in the information recording medium 10a. To form the first reflective layer 36 on a part of the fine uneven structure, a covering layer such as a resist, not shown, is printed, applied or deposited on a part of the metal layer serving as the first reflective layer 36. According to the covering pattern, the metal layer is selectively removed to provide the first reflective layer 36 on a part of the fine uneven structure.

For example, there are four methods, as set forth below, of providing a covering layer on a part of the metal layer serving as a first reflective layer 36.

A first method is to partially provide a covering layer by printing. A second method is to apply a resin material which, when exposed to ultraviolet light, either increases or decreases its solubility, and then expose the resin material to ultraviolet light to produce a pattern, followed by developing the covering layer. A third method is to form a covering layer after partially forming a soluble resin, and partially remove the soluble resin and the covering layer by a solvent. A fourth method is to deposit a covering layer on a metal layer serving as a first reflective layer 36, the etchant permeability of the former being different from that of the latter, and selectively etch these layers making use of the difference in etchant permeability of these layers.

Some methods of forming an intermediate layer 30 that includes a diffraction structure layer 32 and a first reflective layer 36 have been described above. Besides these methods, the intermediate layer 30 may be provided by forming in advance an intermediate transfer foil that includes an intermediate layer 30 and transferring the intermediate layer 30 onto a transparent protective sheet 40 or a base material 20.

The carrier may be a plastic film. The plastic film may have a thickness of 12 μm or more and 50 μm or less. The plastic film may be made of PET (polyethylene terephthalate), PEN (polyethylene naphthalate), PP (polypropylene), or the like. A release layer is laminated on the carrier, and a diffraction structure layer 32 and a first reflective layer 36 are laminated in this order on the release layer. Then, an adhesive layer is further laminated to prepare in advance an intermediate transfer foil that includes an intermediate layer 30. The adhesive layer contains a polyester resin, a urethane resin, an acrylic resin or a vinyl chloride resin as a main component. After that, the intermediate transfer foil may be adhered to a transparent protective sheet 40 or a base material 20 by using a heat roll transfer device for performing transfer using a heated roll, a hot stamping device for pressing a heated metal plate, or the like, and then the carrier may be released to provide the intermediate layer 30. A metal plate of a predetermined shape may be prepared and the intermediate transfer foil may be adhered and transferred to an arbitrary position of a transparent protective sheet 40 or a base material 20 by applying heat and pressure by using a hot stamping device, and then the carrier may be released. Thus, an intermediate layer 30 can be provided at a predetermined position and with a predetermined size and shape. A release layer, an intermediate layer 30 and an adhesive layer in a predetermined shape may be formed on a carrier in advance and transferred by a cold lamination transfer method, a heat roll transfer method mentioned above, or the like, and then the carrier may be released. The method of forming an intermediate layer 30 is not limited to the methods described above.

The printed layer 42 is a layer which is entirely or partially provided with arbitrary colors, patterns, characters, symbols, motifs, or the like. The printed layer 42 is imparted with information or a design to be informed by using colors, patterns, characters, symbols, motifs, or the like.

The printed layer 42 is formed by a printing method using an ink. The printing method may be a known method, such as offset printing, gravure printing, relief printing, intaglio printing, screen printing, or inkjet printing.

The ink used for printing depends on the printing method. The ink used for printing includes an offset ink, a letterpress ink, a gravure ink, a relief ink, an intaglio ink or an inkjet ink. Depending on the composition or function, a resin ink, an oil-based ink, or a water-based ink may be used. Furthermore, depending on the drying method, the ink may be an oxidative polymerization ink, a penetrative drying ink, an evaporation drying ink, or an ultraviolet curable ink. The printed layer 42 may be formed of a functional ink whose color changes according to the illumination angle of light or the observation angle. Such a functional ink may be an optically variable ink, a color shifting ink, a pearl ink, or the like.

Alternatively, the printed layer 42 may be formed by electrophotography using toner. In this case, toner is prepared by adhering colored particles such as of graphite or pigment to plastic particles having electrostatic properties. Then, the toner is transferred to an object to be printed by making use of static electrical charge, and then heated and fixed to form a printed layer 42.

An image 22 or engraving 24 is formed by irradiating the information recording medium 10 with a laser beam having an appropriately adjusted amount of energy, focal length and frequency.

The laser beam may have a wavelength of 355 nm or more and 10.6 µm or less. The laser may be a $CO_2$ laser (10.6 µm wavelength), YAG laser (1,064 nm, 532 nm or 355 nm wavelength), $YVO_4$ laser (1,064 nm wavelength), argon laser (488 nm to 514 nm), Yb laser (1,090 nm), or the like. The YAG laser may be preferable from the perspective of the quality of engraving, ease of adjustment, cost, or the like. The laser may be a CW laser or pulsed laser. The pulsed laser may have a width of 100 femtoseconds or more and 1 millisecond or less.

In the present embodiment, such a laser beam is applied, in a pattern, to a target position or range of the base material 20 to develop color and form an image 22 such as a motif, or engraving 24 such as characters.

In the present embodiment, a commercially available laser printer, to which the laser mentioned above is applied, may be used. The types of laser or the method of engraving are not limited to those which are mentioned above. A device that can apply a laser beam suitable for the color-developing properties of the base material 20 to be used may be selected.

According to the information recording medium 10 having such a configuration, light that is incident on the diffraction structure 34 from the transparent protective sheet 40 side develops diffracted light in an observable arbitrary pattern, such as characters or motifs, in a predetermined angular range of the diffraction structure layer 32, and an observer can observe this.

Furthermore, when a laser beam is applied to the base material 20 from the transparent protective sheet 40 side via the intermediate layer 30, the laser beam passes through the diffraction structure 34 and destroys the first reflective layer 36 having no optical transparency. After that, the laser beam reaches the base material 20 and develops color in the polycarbonate. Thus, engraving can be performed.

In this way, the information recording medium 10a enables arbitrary engraving, and at the same time, enables observation of the color-developed base material 20 via the intermediate layer 30 and the transparent protective sheet 40. Accordingly, by changing the observation angle, both the diffracted light caused by the diffraction structure 34 and the engraving of the color-developed base material 20 can be observed from the same face of the information recording medium.

In the information recording medium 10a, the diffraction structure 34 is laminated between the base material 20 and the transparent protective sheet 40 and integrated. Accordingly, it is difficult to physically falsify or counterfeit the diffraction structure 34. In addition, replacement of the engraved base material 20 alone may only leave a trace of removed portions of the first reflective layer 36 in a pattern conforming to the previous engraving. In other words, falsified or counterfeited engraving cannot be observed because of being shielded by the first reflective layer 36. Consequently, falsification or counterfeiting is extremely difficult.

If falsification or counterfeiting is performed, different diffracted light is observed and thus the falsification or counterfeiting can be easily detected. Thus, the information recording medium can provide effective authenticity determination.

Second Embodiment of the Present Invention

Figure 3:
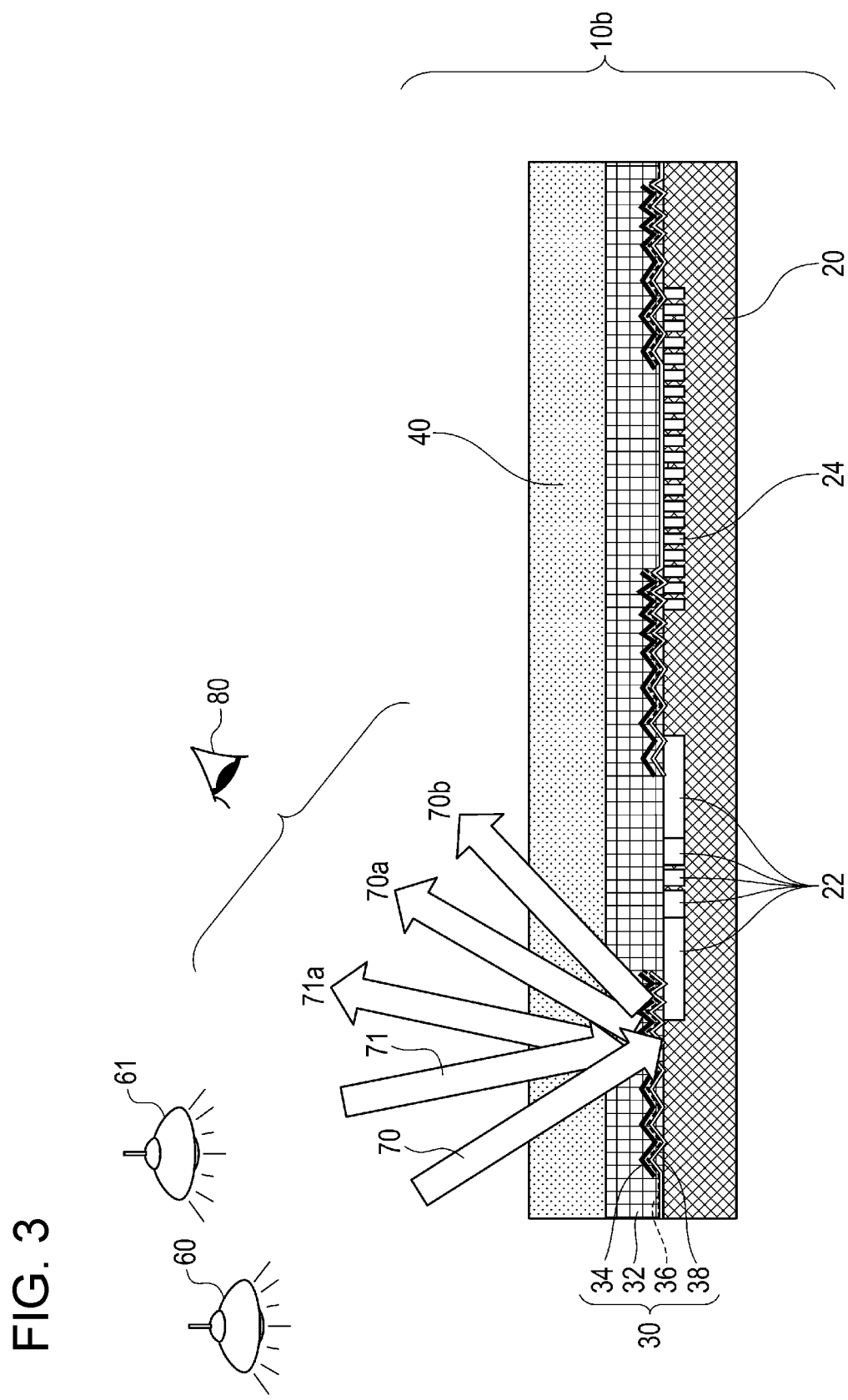
FIG. 3 is a schematic cross-sectional view illustrating an information recording medium according to a second embodiment of the present invention.

FIG. 3 is a schematic cross-sectional view illustrating an information recording medium 10b according to a second embodiment of the present invention. FIG. 3 is a cross-sectional view taken along the line A-A of the information recording medium 10 shown in FIG. 1.

The information recording medium 10b is different from the information recording medium 10a in that the intermediate layer 30 further includes a second reflective layer 38. The second reflective layer 38 has metallic glossiness. In the intermediate layer 30, the second reflective layer 38 is disposed closer to the base material 20 than is the first reflective layer 36. The second reflective layer 38 is not destroyed when irradiated with a laser beam but transmits light having a first wavelength (e.g., 380 nm to 500 nm) and reflects visible light having a wavelength other than the first wavelength. The first wavelength may be a wavelength of the laser beam to be applied.

The second reflective layer 38 may be a transparent film having a high refractive index. The transparent film may be made of a material having a difference in refractive index of 0.2 or more and 1.3 or less from the diffraction structure layer 32. For example, when the diffraction structure layer 32 is made of a resin having a refractive index of 1.6 or less, the second reflective layer 38 may be a film that is made of a transparent material having a refractive index of 1.8 or more and 2.9 or less.

Such a transparent material may be an inorganic compound. The inorganic compound may be a metal compound or a metalloid compound. The metal compound or the metalloid compound may be $Fe_2O_3$ (n=2.7), $TiO_2$ (n=2.6), CdS (n=2.6), $CeO_2$ (n=2.3), ZnS (n=2.3), $PbCl_2$ (n=2.3), CdO (n=2.2), $WO_3$ (n=2.0), SiO (n=2.0), $Si_2O_3$ (n=2.5), $In_2O_3$ (n=2.0), PbO (n=(2.6), $Ta_2O_3$ (n=2.4), ZnO (n=2.1), $ZrO_2$ (n=2.0), or the like. n represents the refractive index. The transparent film may be formed by a vacuum film deposition method. The film may have a thickness of 5 nm or more and 100 nm or less.

According to the information recording medium 10b having such a configuration, when incident light 70, 71 is incident on the second reflective layer 38 from a light source 60, 61, a specific color is observed from the reflected light. Thus, depending on the angle of observation, an observer 80 observes three kinds of light, i.e. reflected light 70a from the color developed base material 20, diffracted light 70b from the diffraction structure 34 and reflected light 71a of the specific color.

When a laser beam is applied from the transparent protective sheet 40 side and the first reflective layer 36 is removed by the laser beam, the observer 80 can observe the diffracted light from the diffraction structure 34 at some observation angle in the laser engraved area while the second reflective layer 38 keeps its transparency, due to the difference in refractive index between the diffraction structure layer 32 and the second reflective layer 38.

Thus, the information recording medium 10b enables observation of extremely complicated reflected light or diffracted light which changes depending on the light source or the observation angle. Since this cannot be easily reproduced, falsification or counterfeiting will be difficult. Falsification or counterfeiting, if any, will cause emission of different light and thus authenticity of the information recording medium can be easily determined.

Third Embodiment of the Present Invention

Figure 4:
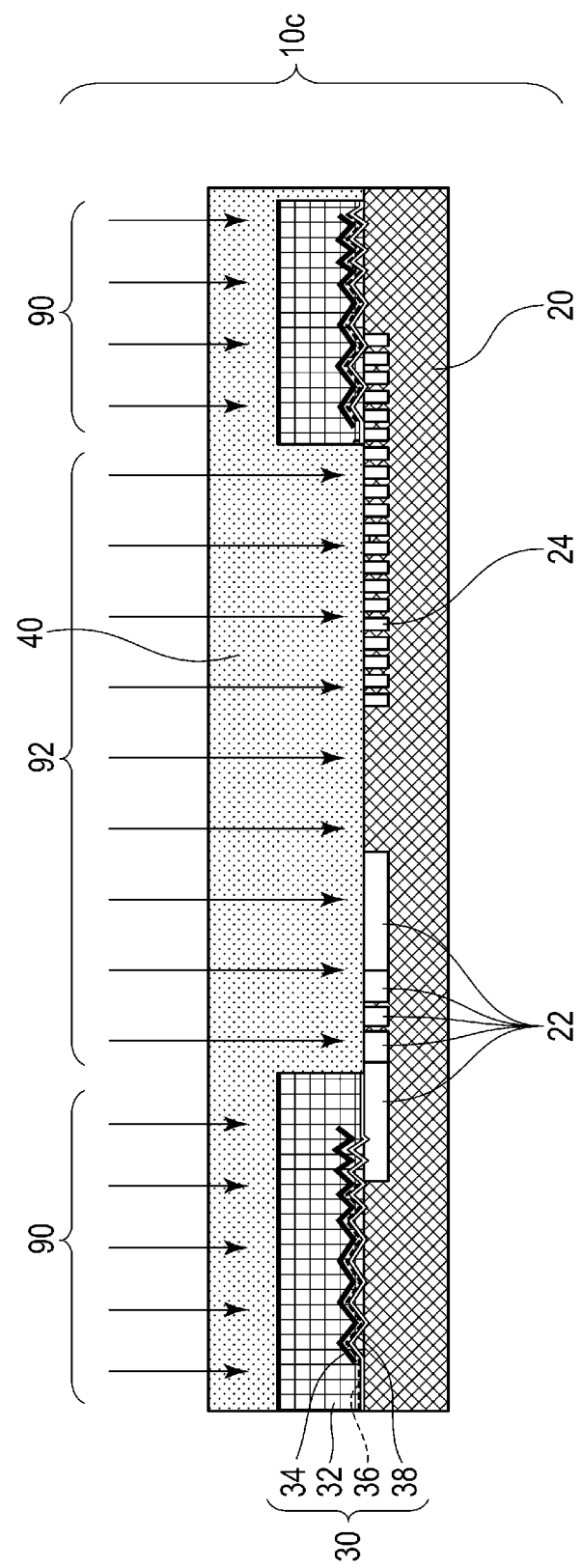
FIG. 4 is a schematic cross-sectional view illustrating an information recording medium according to a third embodiment of the present invention.

FIG. 4 is a schematic cross-sectional view illustrating an information recording medium 10c according to a third embodiment of the present invention. FIG. 4 is a cross-sectional view taken along the line A-A of the information recording medium 10 shown in FIG. 1.

The information recording medium 10c is different from the information recording medium 10b in that the intermediate layer 30 is disposed only at a part between the base material 20 and the transparent protective sheet 40.

Figure 5:
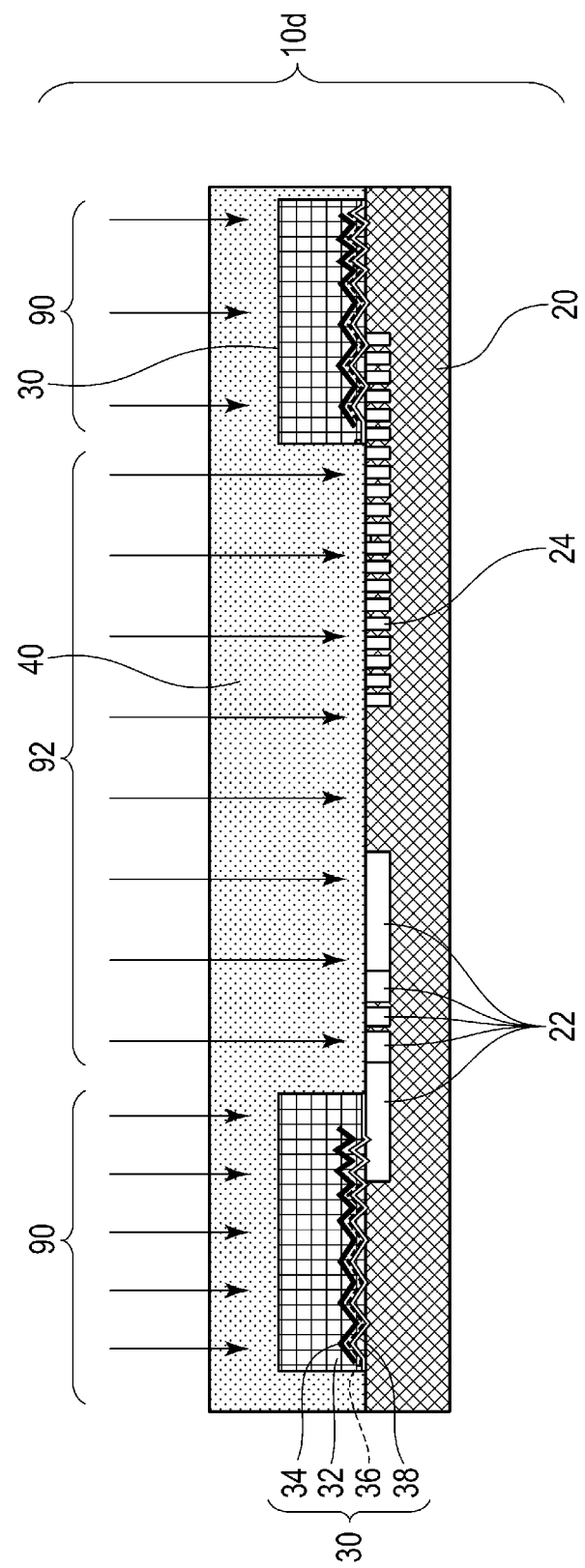
FIG. 5 is a schematic cross-sectional view illustrating an information recording medium according to a modification of the third embodiment of the present invention.

FIG. 5 is a schematic cross-sectional view illustrating an information recording medium 10d according to a modification of the third embodiment of the present invention. FIG. 5 is a cross-sectional view taken along the line A-A of the information recording medium 10 shown in FIG. 1.

In the information recording medium 10d shown in FIG. 5, the intermediate layer 30 is disposed only at a part, as in FIG. 4, between the base material 20 and the transparent protective sheet 40, while being completely enclosed by the base material 20 and the transparent protective sheet 40 so as not to be exposed to the outside.

Thus, physical falsification or counterfeiting by separating the base material 20 and adhering another base material will be difficult.

According to the information recording media 10c and 10d, when laser beams 90 and 92 are continuously applied while being moved, from the transparent protective sheet 40 side, to both the region where the intermediate layer 30 is disposed and the region where it is not disposed, the laser beam 90 applied to the region where the intermediate layer 30 is disposed passes through the diffraction structure layer 32, destroys the first reflective layer 36, passes through the second reflective layer 38, and develops color in the base material 20. However, this portion of the color developed base material 20 cannot be observed from the transparent protective sheet 40 side because of being shielded by the second reflective layer 38.

The laser beam 92 applied to the region where the intermediate layer 30 is not disposed develops color in the base material 20. This portion of the color developed base material 20 can be observed from the transparent protective sheet 40 side. This realizes a color development pattern having a countermark whose shape is determined by the arrangement of the intermediate layer 30.

Thus, the information recording media 10c and 10d each realize a color development pattern which is quite complicated and cannot be easily reproduced. Therefore, the information recording media 10c and 10d are unlikely to be falsified or counterfeited. Furthermore, as shown in FIG. 5, encapsulation of the intermediate layer 30 can make it difficult to physically perform falsification or counterfeiting.

The color development pattern is displayed being imparted with a countermark whose shape is determined by the arrangement of the intermediate layer 30. Only limited persons including the manufacturer and persons informed by the manufacturer are aware of the arrangement and the shape of the intermediate layer 30.

Accordingly, it is impossible for a third party to reproduce the correct color development pattern having a countermark by falsification or counterfeiting. Therefore, the information recording media 10c and 10d cannot be falsified or counterfeited.

If falsification or counterfeiting is performed, authenticity can be easily determined when the manufacturer or the persons informed by the manufacturer examine the color development pattern.

Fourth Embodiment of the Present Invention

Figure 6:
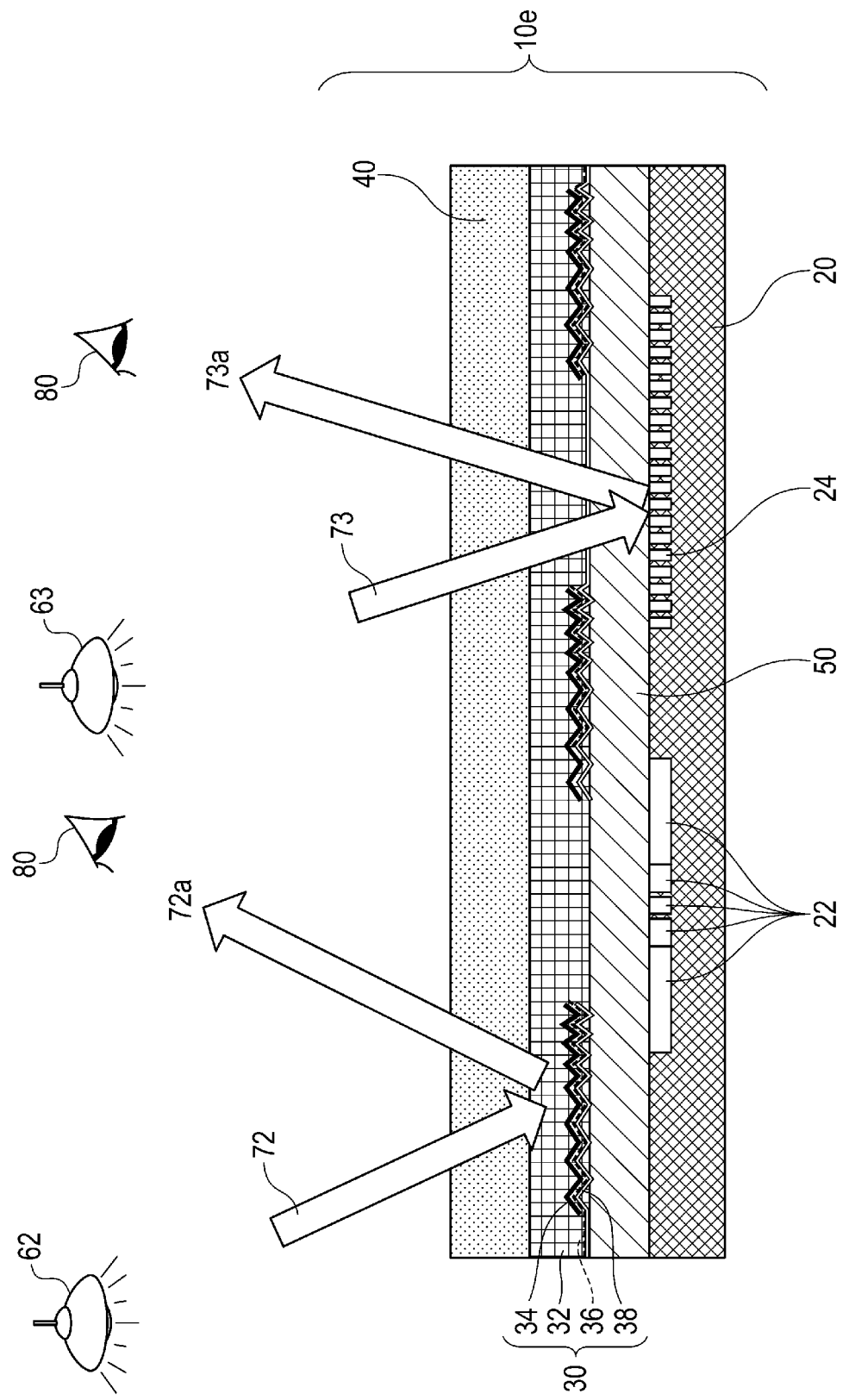
FIG. 6 is a schematic cross-sectional view illustrating an information recording medium according to a fourth embodiment of the present invention.

FIG. 6 is a schematic cross-sectional view illustrating an information recording medium 10e according to a fourth embodiment of the present invention. FIG. 6 is a cross-sectional view taken along the line A-A of the information recording medium 10 shown in FIG. 1.

The information recording medium 10e is different from the information recording medium 10b in that a colored layer 50 is provided between the intermediate layer 30 and the base material 20.

The colored layer 50 transmits visible light (e.g., 380 nm or more and 650 nm or less) of a second wavelength range and reflects visible light having a wavelength out of the second wavelength range.

The colored layer 50 may be a printing ink formulated by adding a colored dye or pigment to a transparent resin binder that is a main resin of the ink of the printed layer 42 so as to retain optical transparency, or a printing ink formulated by adding a functional material, which has a characteristic of reflecting or absorbing visible light of a specific wavelength, to the transparent resin binder. The colored layer 50 can be formed by a known printing method.

The colored layer 50 contains a color former that develops color when irradiated with a laser beam and changes its color-development intensity depending on the laser irradiation conditions. The color former may have any color as long as the color is visually observable, and thus may be cyan, magenta or yellow used singly or mixed as desired.

The content or the concentration of the color former is adjusted to a value enabling visual observation of the color and raising no problem in adhesion between the layers. When the content of the resin in the colored layer 50 is 1, the content of the color former may be in the range of 0.01 wt % to 30 wt %, and more preferably in the range of 0.5 wt % to 5 wt %. If the content of the color former is 0.01 wt % or less, it is difficult to observe the color, and if the content exceeds 30 wt %, there may occur a problem in adhesion between the layers.

The material for the color former may be either a dye or a pigment. Specifically, cyan color formers may include pigments such as Victoria blue lake, metal-free phthalocyanine blue, phthalocyanine blue and fast sky blue, and dyes such as Victoria blue. Magenta color formers may include pigments such as permanent red 4R, brilliant fast scarlet, brilliant carmine BS, permanent carmine FB, lithol red, permanent red FSR, brilliant carmine 6B, pigment scarlet 3B, rhodamine lake B, rhodamine lake Y and alizarin lake, and dyes such as rhodamine. Yellow color formers may include pigments such as zinc yellow, zinc chromate, lemon yellow (barium chromate), naphthol yellow S, Hansa yellow 5G, Hansa yellow 3G, Hansa yellow G, Hansa yellow GR, Hansa yellow A, Hansa yellow RN, Hansa yellow R, benzine yellow, benzine yellow G, benzine yellow GR, permanent yellow NCG and quinoline yellow lake, and dyes such as auramine. These pigments or dyes may be used singly or in combination of two or more.

According to the information recording medium 10e having such a configuration, the observer 80 can observe reflected light 72a which is a reflection of incident light 72 that is incident from a transparent protective sheet 40 side light source 62.

When data is written on the undermost layer, i.e. the base material 20, using incident light 73 that is a laser beam applied from a transparent protective sheet 40 side laser beam source 63, the engraved area of the base material 20 is colored because the colored layer 50 is provided above the discolored engraved portions of the base material 20.

Since the color-development intensity depends on the irradiation conditions of the laser beam as incident light 73, arbitrary engraving densities can be produced with one color.

Thus, since it is not easy to reproduce a state in which engraving is differently observed depending on the conditions, performing falsification or counterfeiting is difficult. If falsification or counterfeiting is performed, authenticity can be easily determined by confirming whether the engraving can be correctly observed.

Fifth Embodiment of the Present Invention

Figure 7:
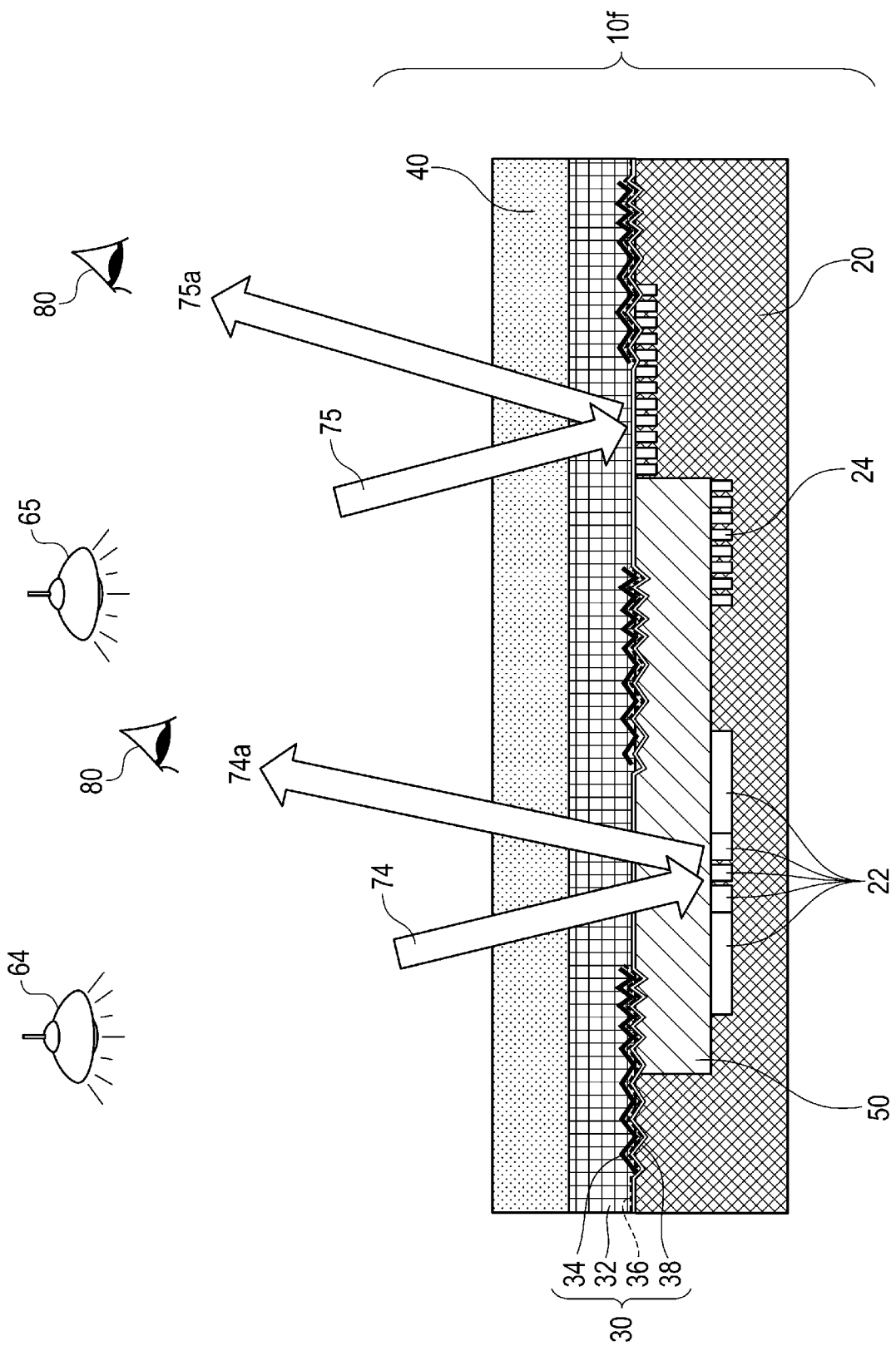
FIG. 7 is a schematic cross-sectional view illustrating an information recording medium according to a fifth embodiment of the present invention.

FIG. 7 is a schematic cross-sectional view illustrating an information recording medium 10f according to a fifth embodiment of the present invention. FIG. 7 is a cross-sectional view taken along the line A-A of the information recording medium 10 shown in FIG. 1.

The information recording medium 10f is different from the information recording medium 10e in that the colored layer 50 is formed being enclosed between the base material 20 and the intermediate layer 30, instead of being formed across the entire surface of the medium, so that the shape of the colored layer 50 cannot be observed from outside The colored layer 50 may have a regular shape.

According to the information recording medium 10f having such a configuration, the observer 80 can observe colored reflected light 74a which is a reflection of incident light 74 that is incident on a region where the colored layer 50 is present from a transparent protective sheet 40 side laser beam source 64.

On the other hand, the observer 80 observes non-colored reflected light 75a which is a reflection of incident light 75 that is incident on an engraved area where the colored layer 50 is not present from a transparent protective sheet 40 side laser beam source 65.

When a laser beam is applied from the laser beam source 64 to the region where the colored layer 50 is present, the first reflective layer 36 is removed but the second reflective layer 38 and the red colored layer 50 remain, with the base material 20 thereunder developing color at arbitrary densities. Since there remains the first reflective layer 36 throughout the area that has not been subjected to laser engraving, the second reflective layer 38, and the colored layer 50 and the base material 20 thereunder cannot be observed.

With this configuration of the information recording medium 10f, in the region where the facial image 22 is laser-engraved and the colored layer 50 is formed, the facial image 22 appears being colored red with the reflected light 74a that is a reflection of the incident light 74. In the region where the colored layer 50 is not formed, the engraving 24 in the original color can be observed with the reflected light 75a that is a reflection of the incident light 75, similarly to the engraving 24 of the information recording medium 10a.

In other words, in the region where the colored layer 50 is present, the laser-engraved area is colored red, and in the region where it is not present, the engraving with the original color is presented. Thus, the base material 20 develops color according to the arrangement pattern of the colored layer 50.

The manufacturer of the information recording medium 10 and those who are informed by the manufacturer are the only persons who are aware of the configuration of the colored layer 50 before laser engraving, while the colored layer 50 is configured into a desired arbitrary shape using a known printing method. Accordingly, it is impossible for a third party to reproduce the correct color development pattern by falsification or counterfeiting. Therefore, the information recording medium 10f cannot be falsified or counterfeited.

Photochromic effects are exerted in the laser-drawn portions, such as the facial image 22 and the engraving 24, which are provided with the diffraction structure 34 and the second reflective layer 38. The photochromic effects are exerted such that the diffracted light can be observed in a specific angular range, and the facial image 22 or the engraving 24 can be observed in another angular range.

If the information recording medium is attempted to be falsified by cutting out only the base material 20 from the surface not provided with the transparent protective sheet 40 and adhering another base material 20 instead on which fraudulent information is engraved, the fraudulent information cannot be observed from the protective sheet 40 side due to the presence of the first reflective layer 36.

If the information recording medium is counterfeited by cutting out the facial image 22 from the transparent protective sheet 40 side and adhering another fraudulent facial image instead, diffracted light cannot be observed on the facial image from any angle.

Thus, if falsification or counterfeiting is performed, the information recording medium can be easily determined not to be authentic.

Modifications

Although not shown in the drawings referred to in the above embodiments, the information recording media may each be provided with an adhesive layer as necessary between the transparent protective sheet 40, the base material 20, the intermediate layer 30, and the like, partially or throughout the surface of the layers to provide intimate contact.

The adhesive layer may be made of an adhesive containing a polyester resin, a urethane resin, an acrylic resin, a vinyl chloride resin, or the like as a main component. As necessary, an adhesion-enhancing agent, a filler, a softener, a heat/light stabilizer, an antioxidant, or the like may be added. The adhesion-imparting agent may be a rosin-based resin, a terpene phenol resin, a terpene resin, an aromatic hydrocarbon-modified terpene resin, a petroleum resin, a coumarone-indene resin, a styrene-based resin, a phenol-based resin, a xylene resin, or the like.

The filler may be zinc white, titanium oxide, silica, calcium carbonate, barium sulfate, or the like. The softener may be process oil, liquid rubber, plasticizer, or the like. The heat/light stabilizer may be a benzophenone-, benzotriazole- or hindered amine-based heat/light stabilizer, or the like. The antioxidant may be an anilide-, phenol-, phosphite- or thio-ester-based antioxidant, or the like. The adhesive layer may have a thickness depending on the usage, but may usually be 0.1 μm or more and 10 μm or less, and more preferably, 1 μm or more and 5 μm or less. The adhesive layer may be formed by a known printing or coating method.

The present invention will be more specifically described by way of examples. In the following examples, when "part(s)" is mentioned, it refers to "part(s) by mass".

Example 1

Figure 8:
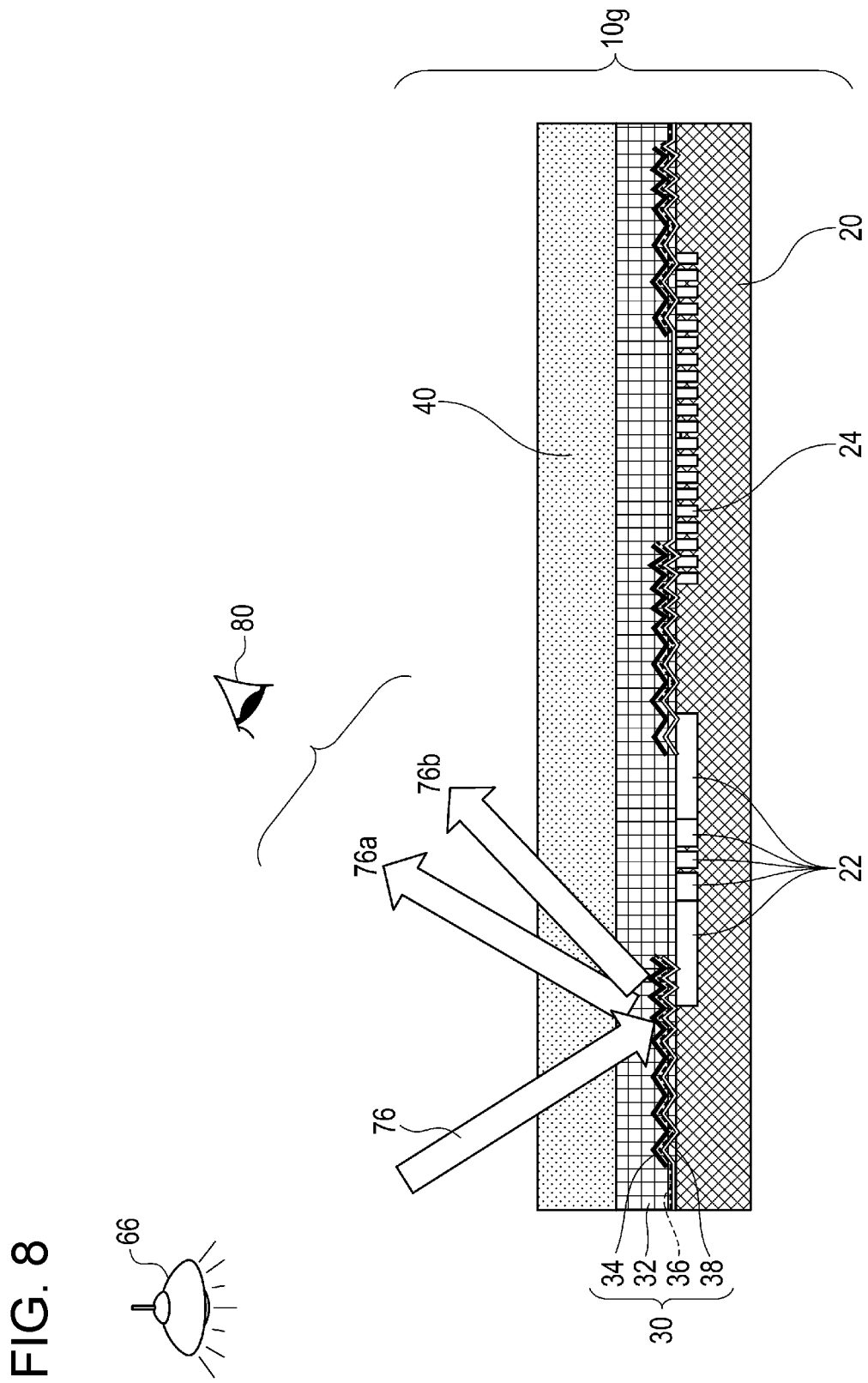
FIG. 8 is a schematic cross-sectional view illustrating an information recording medium according to Example 1 of the present invention.

An information recording medium 10g having a cross-sectional configuration as shown in FIG. 8 was prepared as Example 1. The configuration of the information recording medium 10g shown in FIG. 8 is the same as that of the information recording medium 10b shown in FIG. 3.

To prepare the information recording medium 10g, a transparent polycarbonate (PC) film having a thickness of 100 μm was used as a transparent protective sheet 40.

Next, a printed layer ink comprising the following composition was printed in character shapes on a surface of the transparent protective sheet 40 by gravure printing, and dried to form a printed layer 42 having a thickness of 1 μm.

| [Adhesive layer ink] | |
| --- | --- |
| White pigment | 15 parts |
| Vinyl chloride-vinyl acetate copolymer | 25 parts |
| Toluene | 20 parts |
| Methyl ethyl ketone | 40 parts |

Next, a diffraction structure layer ink comprising the following composition was applied by gravure printing onto the surface of the transparent protective sheet 40 where the printed layer 42 had been formed, and dried to form a diffraction structure layer 32 having a thickness of 1.5 μm.

| (Diffraction structure layer ink) | |
| --- | --- |
| Urethane resin | 20 parts |
| Ethyl acetate | 30 parts |
| Methyl ethyl ketone | 50 parts |

Next, a pressing plate, in which a master block that was the reverse of a diffraction structure 34 was formed, was heated and pressed against the diffraction structure layer 32 by a roll embossing method to form a diffraction structure 34 thereon.

Next, an aluminum film having a thickness of 40 nm was formed by a vacuum vapor deposition method in advance as a first reflective layer 36 of the diffraction structure 34, followed by forming a titanium oxide film having a thickness of 60 nm to thereby provide an intermediate layer 30 on the transparent protective sheet 40.

Next, the transparent protective sheet 40 that had been provided with the intermediate layer 30 was disposed on a surface of a base material 20 made of a laser color-developing polycarbonate having a thickness of 600 μm so that the intermediate layer 30 was located on the inside, followed by thermal pressing by using a pressing device at a temperature of 185° C. and a pressure of about 0.9 MPa to integrate the transparent protective sheet 40, the intermediate layer 30 and the base material 20 together. The resultant laminate was then die-cut into cards.

Finally, a facial image and user's textual information were prepared for each card as personal information. Each card was then set to a laser marking device incorporated with a YAG laser having a wavelength of 1,064 nm, so that the transparent protective sheet 40 was on top. Then, a laser beam was applied to the base material 20 via the transparent protective sheet 40 to form a facial image 22 and character engraving 24, thereby producing an information recording medium 10g for application as an anti-counterfeiting medium.

In the information recording medium 10g produced in this way, the first reflective layer 36 is removed from the laser-engraved area but the second reflective layer 38 remains, with the base material 20 as an underlayer being color-developed at arbitrary densities. Since there remains the first reflective layer 36 throughout the area that has not been subjected to laser engraving, the second reflective layer 38 and the base material 20 thereunder cannot be observed.

Accordingly, at some observation angle, the observer 80 can observe reflected light 76a that is a reflection of incident light 76 that has been incident from a light source 66, and at another observation angle, can observe diffracted light 76b caused by the diffraction structure 34. At an observation angle approximate to a right angle where neither the reflected light 76a nor the diffracted light 76b is observable, the observer 80 can observe the printed layer 42 because the printed layer 42 is formed right beneath the transparent protective sheet 40. Furthermore, at portions of a laser-engraved area where the diffracted structure 34 is formed on the second reflective layer 38, the observer can observe the diffracted light 76b at some observation angle. Thus, the information recording medium 10g offers a wide variety of photochromic effects depending on the observation angles.

If falsification of the information recording medium 10g is attempted by cutting out only the base material 20 from the surface not provided with the transparent protective sheet 40 and adhering another base material 20 instead on which fraudulent information is printed, the fraudulent information cannot be observed due to the presence of the first reflective layer 36. As another method, if counterfeiting of the information recording medium 10g is attempted by cutting out the facial image 22 from the transparent protective sheet 40 side and adhering a fraudulent facial image instead, diffracted light is observed on the facial image at any observation angle. Thus, counterfeiting can be easily detected.

Example 2

An information recording medium 10f having a cross-sectional configuration as shown in FIG. 7 was prepared as Example 2.

To prepare the information recording medium 10f, a transparent polycarbonate (PC) film having a thickness of 100 μm was used as a transparent protective sheet 40.

Next, characters were printed on a surface of the transparent protective sheet 40 by offset printing using a printed layer ink comprising the following composition to form a printed layer 42 having a thickness of 1

| [Printed layer ink] | |
| --- | --- |
| Calcium carbonate | 20 parts |
| Rosin modified phenol resin | 25 parts |
| Vegetable oil | 20 parts |
| Industrial volatile oil | 35 parts |

Next, a diffraction structure layer ink comprising the following composition was applied by gravure printing onto the surface of the transparent protective sheet 40 where the printed layer 42 had been formed, and dried to form a diffraction structure layer 32 having a thickness of 1.5 μm. Next, a pressing plate, in which a master block that was the reverse of a diffraction structure 34 was formed, was heated and pressed against the diffraction structure layer 32 by a roll embossing method to form a diffraction structure 34 thereon.

| (Diffraction structure layer ink) | |
|---|---|
| Urethane resin | 20 parts |
| Ethyl acetate | 30 parts |
| Methyl ethyl ketone | 50 parts |

Next, an aluminum film having a thickness of 40 nm was formed by vacuum vapor deposition in advance as a first reflective layer 36 of the diffraction structure 34, followed by forming a zinc sulfide film having a thickness of 70 nm also by vacuum vapor deposition as a second reflective layer 38 to thereby provide an intermediate layer 30 on the transparent protective sheet 40.

Next, the following colored layer ink was applied in an arbitrary shape by gravure printing onto a part of a surface of a base material 20 made of a laser color-developing polycarbonate and having a thickness of 600 µm, followed by drying to provide a colored layer 50 having a thickness of 1 µm.

| (Colored layer ink) | |
|---|---|
| Rhodamine dye | 3 parts |
| Vinyl chloride-vinyl acetate copolymer | 25 parts |
| Toluene | 30 parts |
| Methyl ethyl ketone | 40 parts |
| Others including additives | 2 parts |

Next, the transparent protective sheet 40 provided with the intermediate layer 30 was disposed on the base material 20 provided with the colored layer 50, such that the intermediate layer 30 was brought into contact with the colored layer 50, followed by thermal pressing at a temperature of 185° C. and a pressure of about 0.9 MPa by using a pressing device to integrate the transparent protective sheet 40, the intermediate layer 30, the colored layer 50 and the base material 20 together. The resultant laminate was die-cut into cards so that the colored layer 50 was completely encapsulated in each of the cards.

Finally, a facial image and user's textual information were prepared for each card as personal information. Each card was then set to a laser marking device incorporated with a YAG laser having a wavelength of 1,064 nm, so that the transparent protective sheet 40 was on top. Then, a laser beam was applied to the base material 20 via the transparent protective sheet 40 to form a facial image 22 and character engraving 24, thereby producing an information recording medium 10f for application as an anti-counterfeiting medium.

In the information recording medium 10f produced in this way, the first reflective layer 36 is removed from the laser-engraved area but the second reflective layer 38 and the red colored layer 50 remain, with the base material 20 as an underlayer being color-developed at arbitrary densities. Since there remains the first reflective layer 36 throughout the area that has not been subjected to laser engraving, the second reflective layer 38, and the colored layer 50 and the base material 20 thereunder cannot be observed.

In the region where the facial image 22 is laser-engraved and the colored layer 50 is formed, the facial image 22 appears being colored red with the reflected light 74a that is a reflection of the incident light 74 from the light source 64.

In the region where the colored layer 50 is not formed, the reflected light 75a that is a reflection of the incident light 75 is observed with the original color of the engraving 24. Specifically, in the region where the colored layer 50 is present, the area subjected to laser engraving is observed being colored red, while in the region where the colored layer 50 is not formed, the original color of the engraving is observed.

Only limited persons including the manufacturer of the information recording medium 10f and those who are informed by the manufacturer are aware of the shape of the colored layer 50 before laser engraving. The colored layer 50 is formed into a desired arbitrary shape by a known printing method. In particular, when the area of laser engraving is large, the shape of the colored layer 50 can be used for determining authenticity.

Photochromic effects are exerted in the laser-drawn portions, such as the facial image 22 and the engraving 24, which are provided with the diffraction structure 34 and the second reflective layer 38. The photochromic effects are exerted such that the diffracted light can be observed in a specific angular range, and the facial image 22 or the engraving 24 can be observed in another angular range.

If falsification of the information recording medium 10f is attempted by cutting out only the base material 20 from the surface not provided with the transparent protective sheet 40 and adhering another base material 20 instead on which fraudulent information is engraved, the fraudulent information cannot be observed from the protective sheet 40 side due to the presence of the first reflective layer 36. As another method, if counterfeiting of the information recording medium 10f is attempted by cutting out the facial image 22 from the transparent protective sheet 40 side and adhering a fraudulent facial image instead, diffracted light cannot be observed on the facial image at any observation angle. Therefore, counterfeiting can be easily detected.

Example 3

An information recording medium 10d shown in FIG. 5 was prepared as Example 3.

To prepare the information recording medium 10d, a transparent polycarbonate (PC) film having a thickness of 100 µm was used as a transparent protective sheet 40.

A printed layer ink comprising the following composition was printed in arbitrary character shapes on a surface of the transparent protective sheet 40 by offset printing to form a printed layer 42 having a thickness of 1 µm.

| [Printed layer ink] | |
|---|---|
| White pigment | 20 parts |
| Rosin modified phenol resin | 25 parts |
| Vegetable oil | 20 parts |
| Industrial volatile oil | 35 parts |

Next, an intermediate layer transfer foil including an intermediate layer 30 was prepared to form the intermediate layer 30 at a desired part and in a desired shape on the transparent protective sheet 40.

As a carrier for the intermediate layer transfer foil, a polyethylene terephthalate (PET) film having a thickness of 25 µm was used.

A release layer ink comprising the following composition was applied to a surface of the carrier by gravure printing and dried to form a release layer having a thickness of 1 µm.

[Release layer ink]

| | |
|---|---|
| Polyamide-imide resin | 19 parts |
| Polyethylene powder | 1 part |
| Dimethylacetamide | 45 parts |
| Toluene | 35 parts |

A diffraction structure layer ink comprising the following composition was applied to a surface of the release layer by gravure printing and dried to form a diffraction structure layer 32 having a thickness of 1.5 µm.

(Diffraction structure layer ink)

| | |
|---|---|
| Urethane resin | 20 parts |
| Ethyl acetate | 30 parts |
| Methyl ethyl ketone | 50 parts |

Next, a pressing plate, in which a master block that was the reverse of a diffraction structure 34 was formed, was heated and pressed against the diffraction structure layer 32 by a roll embossing method to form a diffraction structure 34 thereon.

Next, an aluminum film having a thickness of 40 nm was formed by vacuum vapor deposition in advance as a first reflective layer 36 of the diffraction structure 34, followed by forming a zinc sulfide film having a thickness of 70 nm also by vacuum vapor deposition as a second reflective layer 38.

Next, an adhesive layer ink comprising the following composition was applied to the resultant object by gravure printing and dried to form an adhesive layer having a thickness of 3 µm. Thus, an intermediate layer transfer foil including an intermediate layer 30 was prepared.

[Adhesive layer ink]

| | |
|---|---|
| Vinyl chloride-vinyl acetate copolymer | 15 parts |
| Acrylic resin | 10 parts |
| Methyl ethyl ketone | 45 parts |
| Toluene | 30 parts |

Next, the transparent protective sheet 40 as a transfer target member and the intermediate layer transfer foil as a transferring member were set to a hot stamping device which had a metal stamper prepared with a desired configuration and was capable of continuous transfer. In the setting, the position of the stamper was adjusted such that the intermediate layer 30 to be transferred was ensured to include the diffraction structure 34. Thus, transfer processing was performed by applying heat and pressure to these members to form an intermediate layer 30 on the transparent protective sheet 40.

Next, the transparent protective sheet 40 that had been provided with the intermediate layer 30 was disposed on a surface of a base material 20 made of a laser color-developing polycarbonate having a thickness of 600 µm so that the intermediate layer 30 was located on the inside, followed by thermal pressing by using a pressing device at a temperature of 185° C. and a pressure of about 0.9 MPa to integrate the transparent protective sheet 40, the intermediate layer 30 and the base material 20 together. After that, the laminate was die-cut into cards at desired positions so that the intermediate layer 30 was encapsulated in each card.

Finally, a facial image and user's textual information were prepared for each card as personal information. Each card was then set to a laser marking device incorporated with a YAG laser having a wavelength of 1,064 nm, so that the transparent protective sheet 40 was on top. Then, a laser beam was applied to the base material 20 via the transparent protective sheet 40 to form a facial image 22 and character engraving 24, thereby producing an information recording medium 10d for application as an anti-counterfeiting medium.

In the information recording medium 10d produced in this way, the first reflective layer 36 is removed from the laser-engraved area but the second reflective layer 38 remains, with the base material 20 as an underlayer being color-developed at arbitrary densities. Since there remains the first reflective layer 36 throughout the area that has not been subjected to laser engraving, the second reflective layer 38 and the base material 20 thereunder cannot be observed.

In the information recording medium 10d, the intermediate layer 30 is completely encapsulated by the base material 20 and the transparent protective sheet 40. The base material 20 and the transparent protective sheet 40, which are made of resins similar to each other, are completely fused and bonded together. Accordingly, it is difficult to separate the laser-engraved image 22 or the engraving 24 from the medium. If falsification of the information recording medium 10d is attempted by cutting out only the base material 20 from the surface not provided with the intermediate layer 30 and adhering another base material 20 instead on which fraudulent information is engraved, the fraudulent information cannot be observed due to the presence of the first reflective layer 36. As another method, if counterfeiting of the information recording medium 10d is attempted by cutting out the facial image 22 from the transparent protective sheet 40 side and adhering a fraudulent facial image instead, diffracted light cannot be observed on the facial image at any observation angle. Therefore, counterfeiting can be easily detected.

The information recording medium, label and card of the present invention can be applied to personal verification media, such as IDs, passports or driving licenses in particular, having a diffraction structure and provided with laser-engraved information to prevent falsification or counterfeiting. The method of authentication of the present invention can be applied to authentication of such information recording media.

The present invention is not limited to the embodiments described above, but may be modified in various ways when implemented, without departing from the spirit of the present invention. The embodiments may be adequately combined and implemented. In this case, the combinations each exert the advantageous effects accordingly. The embodiments described above include inventions of various stages. Therefore, a plurality of disclosed elements may be appropriately combined so that various inventions can be obtained.

What is claimed is:

1. An information recording medium formed by laminating a transparent protective layer and a base material having laser color-developing properties, comprising:
    an intermediate layer that is disposed between the transparent protective layer and the base material, wherein
    the intermediate layer includes a diffraction structure layer that has a diffraction structure, and a first reflective layer that reflects visible light and is destroyed when irradiated with a laser beam; wherein
    light, when incident from a transparent protective layer side, causes a diffracted light pattern to appear in the diffraction structure layer so as to be observable from the transparent protective layer side; wherein a laser beam, when applied from the transparent protective layer side, passes through the diffraction structure layer, destroys the first reflective layer, and develops color in the base material; and wherein a colored layer is disposed between the base material and the intermediate layer, the colored layer transmitting visible light of a second wavelength range and reflecting visible light outside the second wavelength range.

2. The information recording medium of claim 1, wherein the colored layer contains a color former that develops color when irradiated with a laser beam and changes color-development intensity depending on laser irradiation conditions.

3. The information recording medium of claim 2, wherein the colored layer is enclosed between the base material and the intermediate layer so that a shape of the colored layer is not observable from outside, the colored layer having an arbitrary shape; and the laser beam, when applied from the transparent protective layer side, develops color in a region where the colored layer is present and develops no color in a region where the colored layer is not present to enable observation of a region that has been colored conforming to the shape of the colored layer.

4. The information recording medium of claim 1, wherein the intermediate layer is completely encapsulated in the base material or the transparent protective layer to configure an integrated laminate.

5. The information recording medium of claim 1, wherein the base material is permitted to develop color in a color development pattern conforming to personal verification information.

6. A label to which the information recording medium of claim 1 is affixed.

7. A card to which the information recording medium of claim 1 is affixed.

8. An information recording medium formed by laminating a transparent protective layer and a base material having laser color-developing properties, comprising:

an intermediate layer disposed at a part between the transparent protective layer and the base material, wherein the intermediate layer includes a diffraction structure layer that has a diffraction structure, a first reflective layer that reflects visible light and is destroyed when irradiated with a laser beam, and a second reflective layer that is not destroyed when irradiated with the laser beam, transmits light of a first wavelength range, and reflects visible light outside the first wavelength range; and when the laser beam is continuously applied while being moved, from a transparent protective layer side, to both a region where the intermediate layer is disposed and a region where the intermediate layer is not disposed, a first laser beam that has entered the intermediate layer via the transparent protective layer passes through the diffraction structure layer, destroys the first reflective layer, passes through the second reflective layer and develops color in the base material, the base material in which color has been developed by the first laser beam being shielded by the second reflective layer and not being observable from the transparent protective layer side; and a second laser beam that has entered the base material via the transparent protective layer but not via the intermediate layer develops color in the base material, the base material in which color has been developed by the second laser beam being observable from the transparent protective layer side, to achieve a color development pattern having a countermark whose shape is determined by an arrangement of the intermediate layer.

9. A method of authentication applied to an information recording medium that is formed by laminating a transparent protective layer and a base material having laser color-developing properties, wherein the information recording medium includes an intermediate layer disposed between the transparent protective layer and the base material;

the intermediate layer includes a diffraction structure layer that has a diffraction structure, and a first reflective layer that reflects visible light and is destroyed when irradiated with a laser beam; and the information recording medium further includes a colored layer at a part between the base material and the intermediate layer, the colored layer developing color when irradiated with a laser beam, the method comprising determining the information recording medium as being authentic if a color development pattern achieved with application of a laser beam from a transparent protective layer side of the information recording medium matches an arrangement of the colored layer, and determining the information recording medium as not being authentic if the color development pattern does not match the arrangement of the colored layer.

10. A method of authentication applied to an information recording medium that is formed by laminating a transparent protective layer and a base material having laser color-developing properties, wherein the information recording medium includes an intermediate layer that is disposed at a part between the transparent protective layer and the base material; and the intermediate layer includes a diffraction structure layer that has a diffraction structure, a first reflective layer that reflects visible light and is destroyed when irradiated with a laser beam, and a second reflective layer that is not destroyed when irradiated with the laser beam, transmits light of a first wavelength range, and reflects visible light outside the first wavelength range, the method comprising when the laser beam is continuously applied while being moved, from a transparent protective layer side, to both a region where the intermediate layer is disposed and a region where the intermediate layer is not disposed, determining the information recording medium as being authentic if a color development pattern having a countermark, whose shape is determined by an arrangement of the intermediate layer, is achieved by color development of the base material, and determining the information recording medium as not being authentic if the color development pattern is not achieved by color development of the base material.

\* \* \* \* \*